US010451789B2

(12) United States Patent
Hsiao et al.

(10) Patent No.: US 10,451,789 B2
(45) Date of Patent: Oct. 22, 2019

(54) LIQUID CRYSTAL DISPLAY DEVICE AND BACKLIGHT MODULE

(71) Applicant: Shenzhen China Star Optoelectronics Technology Co., Ltd., Shenzhen (CN)

(72) Inventors: Yu Chun Hsiao, Shenzhen (CN); Shih Hsiang Chen, Shenzhen (CN); Chengwen Que, Shenzhen (CN); Dehua Li, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/897,337

(22) PCT Filed: Jul. 30, 2015

(86) PCT No.: PCT/CN2015/085585
§ 371 (c)(1),
(2) Date: Oct. 23, 2017

(87) PCT Pub. No.: WO2017/008342
PCT Pub. Date: Jan. 19, 2017

(65) Prior Publication Data
US 2018/0188444 A1    Jul. 5, 2018

(30) Foreign Application Priority Data

Jul. 14, 2015 (CN) .......................... 2015 1 0414116

(51) Int. Cl.
*F21V 8/00* (2006.01)
*G02F 1/13357* (2006.01)
(Continued)

(52) U.S. Cl.
CPC ........... *G02B 6/0045* (2013.01); *G02B 6/002* (2013.01); *G02B 6/005* (2013.01); *G02B 6/0066* (2013.01);
(Continued)

(58) Field of Classification Search
CPC .. G02B 6/0068; G02B 6/005; G02F 1/133615
(Continued)

(56) References Cited

U.S. PATENT DOCUMENTS

| 2014/0036532 A1* | 2/2014 | Lee ...................... G02B 6/0021 362/608 |
| 2014/0240644 A1* | 8/2014 | Abe ...................... G02B 6/0088 362/277 |

(Continued)

FOREIGN PATENT DOCUMENTS

| CN | 101493209 A | 7/2009 |
| CN | 201462582 U | 5/2010 |

(Continued)

OTHER PUBLICATIONS

Notification of Transmittal of the International Search Report and the Written Opinion of the International Searching Authority (Forms PCT/ISA/237, PCT/ISA/210, and PCT/ISA/220) dated Apr. 22, 2016, by the State Intellectual Property Office of People's Republic of China in corresponding International Application No. PCT/CN2015/085585. (14 pages).

(Continued)

*Primary Examiner* — William J Carter
(74) *Attorney, Agent, or Firm* — Andrew C. Cheng

(57) ABSTRACT

A liquid crystal display device and a backlight module are disclosed. The backlight module includes a first light-emitting element; a clamper, which is provided with a curved groove and used for accommodating the first light-emitting element; and a light guide plate that is arranged outside the (Continued)

clamper and provided with a curved end surface which faces the first light-emitting element. The curved end surface and the curved groove are aligned with each other. The liquid crystal display device includes the aforesaid backlight module. The cost of the backlight module is relatively low. A curved liquid crystal display device provided with the backlight module can have a good display effect.

20 Claims, 2 Drawing Sheets

(51) Int. Cl.
  *G02F 1/1333* (2006.01)
  *G02F 1/1335* (2006.01)
(52) U.S. Cl.
  CPC ...... *G02F 1/1336* (2013.01); *G02F 1/133305* (2013.01); *G02F 1/133615* (2013.01)
(58) Field of Classification Search
  USPC .................................................. 362/600–634
  See application file for complete search history.

(56) References Cited

U.S. PATENT DOCUMENTS

| | | |
|---|---|---|
| 2015/0042920 A1 | 2/2015 | Lee et al. |
| 2016/0124138 A1 | 5/2016 | Zhou |
| 2017/0102495 A1 | 4/2017 | Que et al. |

FOREIGN PATENT DOCUMENTS

| | | |
|---|---|---|
| CN | 103824518 A | 5/2014 |
| CN | 104315418 A | 1/2015 |
| CN | 104345496 A | 2/2015 |
| CN | 104914621 A | 9/2015 |
| JP | 2008-198481 A | 8/2008 |
| JP | 2009-87714 A | 4/2009 |
| TW | I330345 B | 9/2008 |

OTHER PUBLICATIONS

Office Action dated Jul. 11, 2017, by the State Intellectual Property Office of People's Republic of China in corresponding Chinese Patent Application No. 201510414116.4 (7 pages).

\* cited by examiner

LIQUID CRYSTAL DISPLAY DEVICE AND BACKLIGHT MODULE

CROSS REFERENCE TO RELATED APPLICATION

The present application claims priority of Chinese patent application CN 201510414116.4, entitled "Liquid Crystal Display Device and Backlight Module" and filed on Jul. 14, 2015, the entirety of which is incorporated herein by reference.

FIELD OF THE INVENTION

The present disclosure relates to liquid crystal display technology, and particularly to a liquid crystal display device and a backlight module.

BACKGROUND OF THE INVENTION

A liquid crystal display device comprises a liquid crystal display panel, which comprises a backlight source and a liquid crystal screen that covers the backlight source. A backlight module serves as a light source of the liquid crystal display panel. The backlight module generally comprises a light guide plate and a bar-shaped light-emitting element that is arranged on a side surface of the light guide plate. The liquid crystal screen covers the backlight module on a light-exiting surface of the light guide plate. The light-emitting element can be a quantum tube or a cold-cathode tube. Other kinds of light source, a Light Emitting Diode (LED) for example, can be used for irradiating the quantum tube, so that quantum dots in the quantum tube can be excited to emit light. The light that is emitted by the quantum tube enters into the light guide plate from a side surface, i.e., a light-entering surface thereof, exits from the light guide plate through a plate surface, i.e., a light-exiting surface thereof, and enters into the liquid crystal screen. The light that exits from the light guide plate can be modulated, so that images and colors can be displayed on the liquid crystal screen.

Due to special structure of eye, a plane image that is received by retina is "distorted" physically, and the "distorted" image needs to be converted into the plane image in the brain. The image that is displayed on a curved liquid crystal screen which has a basically same radian as the eye can be mapped into the brain directly, and thus audiences can enjoy a more comfortable and more natural visual experience.

Since the curved liquid crystal screen has a curved surface, the light guide plate should be bent to be a curved plate which has a same curvature as the liquid crystal screen. Accordingly, in the backlight module in which light enters from a side surface thereof, the light-emitting element also needs to be bent to be a curved shape with the same curvature so as to obtain a better display effect. However, the bar-shaped light-emitting element is generally product with a glass tube shell. For example, with respect to the quantum tube, quantum dots thereof are packaged in a straight glass tube. For another example, with respect to the cold-cathode tube, high luminous efficiency fluorescer with three primary colors is packaged in a hard glass tube. The manufacturing technology of light-emitting element with a certain curvature is complicated, and a cost thereof is rather high. By comparison, the production of straight bar-shaped light-emitting element is simple, a qualified rate of the product is high, and a cost thereof is relatively low.

SUMMARY OF THE INVENTION

The technical problem to be solved by the present disclosure is how to apply a straight bar-shaped light-emitting element to a backlight module of a curved liquid crystal display device so as to obtain a better display effect.

With respect to the aforesaid technical problem, the present disclosure provides a backlight module, comprising:
a first light-emitting element;
a clamper, which is provided with a curved groove and used for accommodating the first light-emitting element; and
a light guide plate that is arranged outside the clamper and provided with a curved end surface which faces the first light-emitting element,
wherein the curved end surface and the curved groove are aligned with each other.

According to one embodiment, the first light-emitting element has a straight bar shape, and two ends of the first light-emitting element are aligned with two ends of the curved groove respectively.

According to one embodiment, the clamper is a tube element that is parallel to the first light-emitting element.

According to one embodiment, the first light-emitting element covers the curved groove.

According to one embodiment, the curved groove is fit by a plurality of straight grooves that are connected with one another in sequence along a curved line.

According to one embodiment, the clamper further comprises a fixing element that is used for fixing the first light-emitting element.

According to one embodiment, the clamper comprises a plurality of fixing elements that are arranged spaced from one another in sequence along an extending direction of the first light-emitting element.

According to one embodiment, the fixing elements are configured to be plates that are perpendicular to the first light-emitting element and through which the first light-emitting element passes.

According to one embodiment, the first light-emitting element is a quantum tube; the backlight module further comprises a second light-emitting element that is arranged outside the clamper and used for exciting the first light-emitting element; and the clamper further comprises a light-entering opening that is arranged between the first light-emitting element and the second light-emitting element.

The present disclosure further provides a liquid crystal display device, which comprises the aforesaid backlight module.

The light that is emitted by the first light-emitting element enters into the light guide plate through the curved groove. The curved groove of the clamper forms a light-exiting opening with a curved line shape, and the light-exiting opening is aligned with the curved end surface of the light guide plate. The curved end surface is the light-entering surface of the light guide plate, and a shape of the light-exiting opening of the clamper matches a shape of the light-entering surface of the light guide plate. In this manner, the light, which is emitted by the first light-emitting element and enters into the light guide plate through the curved groove, can distribute on the curved end surface in a more uniform manner. The light intensity of the curved end surface is more uniform, and the light coupling efficiency, i.e., a utilization ratio of the light that is emitted by the first light-emitting element, can be improved. Therefore, with respect to the liquid crystal display device comprising this kind of backlight module, a better display effect can be obtained. Meanwhile, since with respect to the backlight module, the requirement for the shape of the first light-emitting element is low, the first light-emitting element with a low cost can be used in the backlight module so as to reduce the production cost thereof.

BRIEF DESCRIPTION OF THE DRAWINGS

The present disclosure will be illustrated in detail hereinafter with reference to the embodiments and the drawings. In the drawings.

Figure 1:
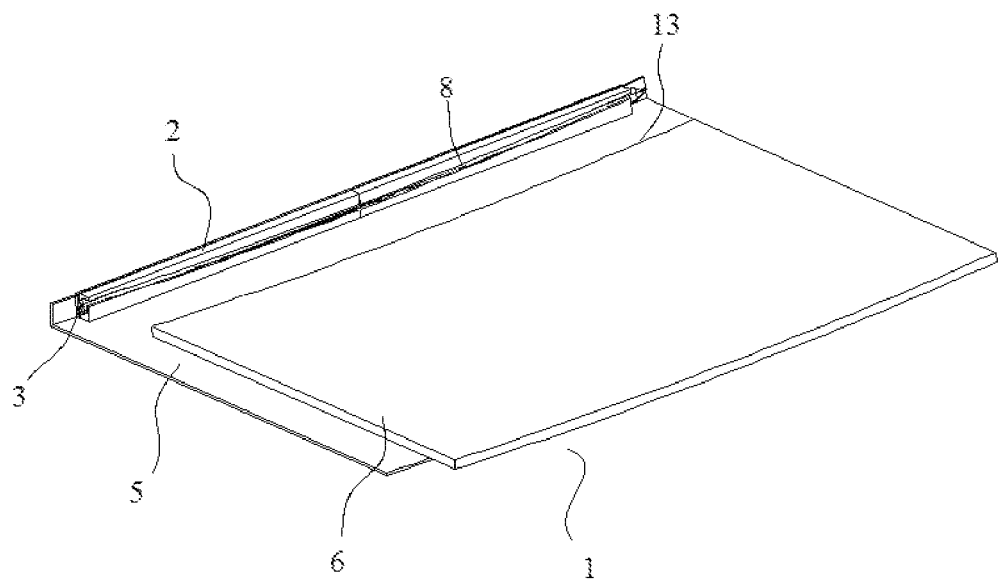
FIG. 1 schematically shows a backlight module in a disassembled state according to a first embodiment of the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

FIG. 1 schematically shows a backlight module 1 according to a first embodiment of the present disclosure. The backlight module 1 comprises a light guide plate 6, a clamper 2, a first light-emitting element 3, a light bar 4 (as shown in FIG. 2), and a backplate 5.

Figure 2:
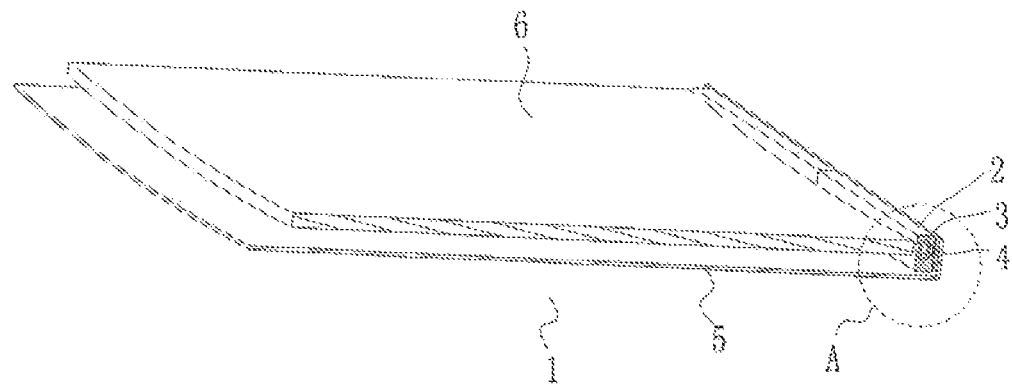
FIG. 2 is a sectional view of the backlight module as shown in FIG. 1.

As shown in FIG. 2, the light guide plate 6 has a curved surface and comprises a bar-shaped curved end surface 13. The curved end surface 13 has a bar-shaped structure and extends along a curved line. The light guide plate 6 can be a plate structure formed by a trajectory of parallel translation of the curved end surface 13 along a direction perpendicular to the curved end surface 13. Thus, the light guide plate 6 has a curved rectangular plate structure. Preferably, a distance between two opposite curved edges of the curved end surface 13 is uniform. The curved edge can be an elliptical arc or a round arc. The light guide plate 6 is generally made of transparent materials with a high refractive index, such as PolymethylMethacrylate (PMMA) with optical grade. A surface of the light guide plate 6, i.e., a first surface is a light-exiting surface, and another surface, i.e., a surface opposite to the first surface is a second surface. Except the second surface, other surfaces of the light guide plate 6, such as each side surface and the first surface, are all very smooth. Preferably, part of the second surface of the light guide plate 6 protrudes outside so as to form serried reflective lattice. One curved end surface 13 of the light guide plate 6 is a light-entering surface. The curved end surface 13 is preferably a plane.

Figure 3:
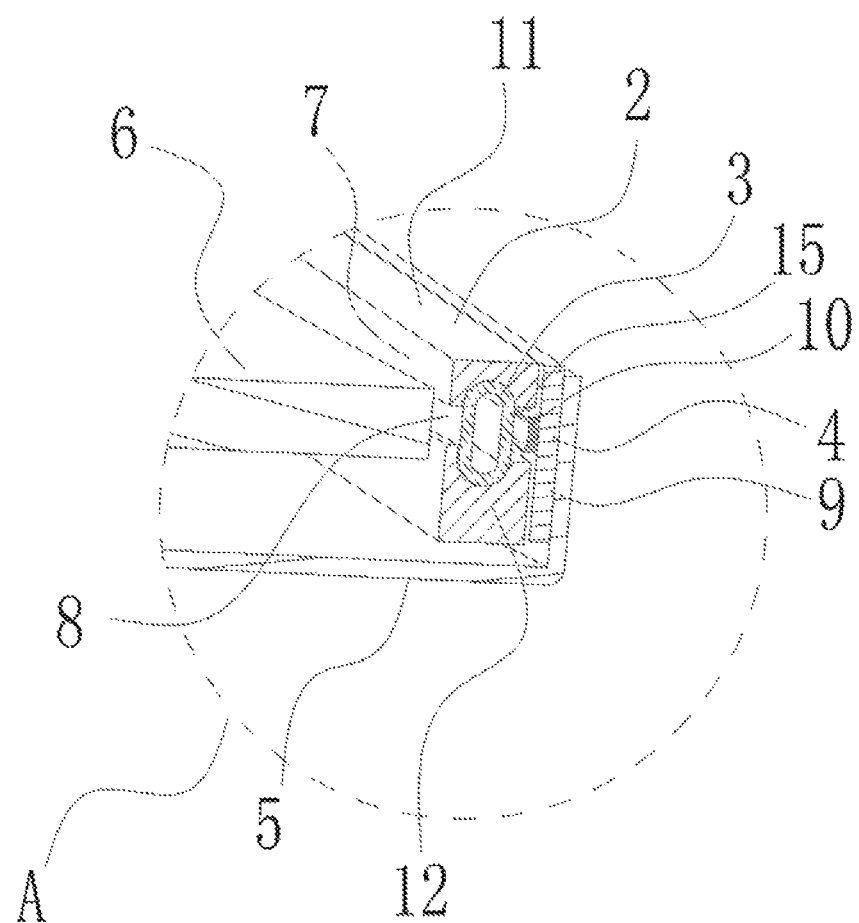
FIG. 3 is an enlarged diagram of position A as shown in FIG. 2.

As shown in FIG. 3, the clamper 2 has a roughly tube structure. The clamper 2 comprises a bulkhead 7. Preferably, the bulkhead 7 is configured to be a long bar structure. More preferably, the bulkhead 7 is a rectangular plate. The bulkhead 7 is provided with a curved groove 8. A shape of a cross section of the curved groove 8 perpendicular to a depth direction thereof is similar to a shape of the light-entering surface of the light guide plate 6. The curved groove 8 passes through the bulkhead 7, and two ends of the curved groove 8 extend to two ends of the bulkhead 7 respectively. One plate of the bulkhead 7 abuts on the light-entering surface of the light guide plate 6, so that the curved groove 8 is aligned with the light-entering surface.

The first light-emitting element 3 is configured to be a straight bar structure and abuts on another plate of the bulkhead 7. The first light-emitting element 3 can be a cold-cathode tube. According to the present embodiment, the first light-emitting element 3 is a quantum tube. The quantum tube comprises a straight glass tube and a plurality of quantum dots that are packaged in the straight glass tube. The quantum dots can be semi-conductive nanoparticles composed of elements of II-VI group or III-V group. The quantum dots can emit fluorescence after being excited. With respect to a wave of the fluorescence that is emitted by quantum dots with a same kind and size, a wave peak thereof is very narrow. Therefore, when the fluorescence passes through a color filter of the liquid crystal display device, monochromatic light with a high color saturation can be obtained. In addition, frequencies of different kinds of quantum dots can cover the spectrum of visible light. Thus, with respect to the liquid crystal display device taking the quantum tube as the light source, a color gamut thereof is large.

The light bar 4 comprises a backplate 9 and a second light-emitting element 10. The backplate 9 is arranged on one surface of the first light-emitting element 3 departing from the bulkhead 7. The second light-emitting element 10 is arranged on one plate of the backplate 9 which faces the first light-emitting element 3. The light that is emitted by the second light-emitting element 10 can excite the quantum tube to emit light. The backplate 9 can be a Printed Circuit Board (PCB), and preferably a soft PCB. The second light-emitting element 10 can be an LED. Preferably, the backplate 9 has a bar-shaped plate structure. An extending direction of the backplate 9 is parallel to an extending direction of the first light-emitting element 3, and a plurality of second light-emitting elements 10 that are spaced from one another distribute in a uniform manner along the extending direction of the backplate 9. In this manner, the brightness of the quantum tube is uniform when it is excited by the plurality of second light-emitting elements 10. The light bar 4 is arranged near to the first light-emitting element 3, and the plate of the backplate 9 on which the light bar 4 is arranged faces the first light-emitting element 3. The backplate 9 is preferably a rectangular plate.

The clamper 2 comprises a light-entering opening 15 that is arranged between the second light-emitting element 10 and the first light-emitting element 3. When the first light-emitting element 3 is the quantum tube, the light that is emitted by the second light-emitting element 10 irradiates the first light-emitting element 3 and excites the first light-emitting element 3 to emit light after passing through the light-entering opening 15. The light that is emitted by the first light-emitting element 3 can only pass through the curved groove 8 and enter into the light guide plate 6. The curved groove 8 of the bulkhead 7 forms a curved light-exiting opening, which is aligned with the curved end surface 13 of the light guide plate 6. In this manner, a positional deviation between the straight bar-shaped first light-emitting element 3 and the light-entering surface of the light guide plate 6 can be reduced. The light which passes through the curved end surface 13 and enters into the light guide plate 6 distributes on the curved end surface 13 in a uniform manner, so that the light intensity of the curved end surface 13 is more uniform, and a light coupling efficiency thereof can be improved. Therefore, with respect to the liquid crystal display device comprising the backlight module 1, a good display effect can be obtained.

Preferably, the second light-emitting element 10 can be a blue LED, and the first light-emitting element 3 comprises two kinds of quantum dots that can be excited by blue light to emit green light and red light respectively. In this manner, part of the blue light that is emitted by the LED can be absorbed by the two kinds of quantum dots in the first light-emitting element 3, and the two kinds of quantum dots can emit green light and red light. Then, the red light, green light, and blue light can mix into white light in the quantum tube, and the white light enters into the light guide plate 6.

Preferably, two ends of the first light-emitting element 3 are aligned with two ends of the curved groove 8 of the bulkhead 7, in this manner, the light which passes through the curved groove 8 can distribute on the cross section of the curved groove 8 perpendicular to the depth direction thereof in a uniform manner, and thus the light, which enters into the light guide plate 6 through the curved end surface 13, can distribute therein in a uniform manner. Therefore, the display effect of the liquid crystal display device can be better.

Preferably, the first light-emitting element 3 abuts on the bulkhead 7 and covers the curved groove 8 of the bulkhead 7. In this manner, the light which passes through the curved groove 8 can distribute on the cross section of the curved groove 8 perpendicular to the depth direction thereof in a uniform manner, and thus the light, which enters into the light guide plate 6 through the curved end surface 13, can distribute therein in a uniform manner. Therefore, the display effect of the liquid crystal display device can be better. At the same time, it can be ensured that the light which enters into the light guide plate 6 through the curved groove 8 is completely emitted by the first light-emitting element 3, so that the case that the light that is emitted by the second light-emitting element 10 directly enters into the light guide plate 6 through a gap between the bulkhead 7 and the first light-emitting element 3 can be avoided. Accordingly, a color distortion of an image displayed on the liquid crystal screen can be avoided.

Preferably, the clamper 2 further comprises a fixing element 12 that is used for fixing the first light-emitting element 3. The fixing element 12 is arranged on one side of the bulkhead 7 near to the first light-emitting element 3. The fixing element 12 is connected to the bulkhead 7. Preferably, a plurality of fixing elements 12 are arranged spaced from one another in sequence on the bulkhead 7 along an extending direction of the bulkhead 7. It equals to that supporting points which are used for supporting the first light-emitting element 3 are increased, and thus force that acts on the first light-emitting element 3 can distribute in a more reasonable manner. More preferably, each fixing element 12 is configured to be a plate perpendicular to a plate of the bulkhead 7, i.e., the extending direction of the bulkhead 7. Each fixing element 12 is provided with a via hole, and the via holes of the plurality of fixing elements 12 are aligned with one another. The first light-emitting element 3 is inserted into the via holes and is fixed by the fixing elements 12. In this manner, the first light-emitting element 3 and the curved groove 8 are fixed. In addition, since the fixing elements 12 are perpendicular to the bulkhead 7, the fixing elements 12 further play the role of strengthening, and a structural strength of the clamper 2 can be improved.

More preferably, the bulkhead 7 has a long bar shape, and the clamper 2 further comprises two side plates 11. The side plates 11 both have a long bar structure and are parallel to each other. The two side plates 11 extend from two sides of the bulkhead 7 respectively and are perpendicular to the bulkhead 7. An extending direction of the side plates 11 is the same as the extending direction of the bulkhead 7. The two side plates 11 and the bulkhead 7 form a groove element used for accommodating the first light-emitting element 3, and a cross section thereof has a groove shape. In this manner, light can be shaded by the side plates 11 of the clamper 2, so that light leakage from the two sides of the clamper 2 can be avoided. Meanwhile, since the first light-emitting element 3 is accommodated in the clamper 2, three surfaces of the first light-emitting element 3 are shaded, and thus the first light-emitting element 3 would not be easily destroyed.

More preferably, the first light-emitting element 3 is a quantum tube, and the light bar 4 is arranged on one side of the clamper 2 departing from the bulkhead 7. The backplate 9 of the light bar 4 covers the clamper 2 from a side thereof departing from the backplate 9. The backplate 9 abuts on the side surfaces of the two side plates 11 departing from the bulkhead 7. The backplate 9 is parallel to the bulkhead 7. The backplate 9, two side walls, and the bulkhead 7 form a tube structure used for accommodating the first light-emitting element 3. The second light-emitting element 10 of the light bar 4 faces the first light-emitting element 3. In this manner, the light that is emitted by the first light-emitting element 3 and the second light-emitting element 10 can be shaded by the clamper 2 and the backplate 9. The light can only exit from the curved groove 8, so that the light leakage of the backlight module 1 can be avoided. At the same time, since the first light-emitting element 3 is accommodated in the tube structure formed by the light bar 4 and the clamper 2, the quantum tube would not be easily destroyed.

More preferably, a surface of the clamper 2 facing the first light-emitting element 3 has a white color. The light that is emitted by the first light-emitting element 3 has a relatively high reflectivity on the white surface of the clamper 2. Part of the light that is emitted by the first light-emitting element 3 and irradiates the surface of the clamper 2 facing the first light-emitting element 3 is reflected to the curved groove 8, and then exits from the curved groove 8. In this manner, the utilization ratio of the light and the brightness of the light-exiting surface of the light guide plate 6 can both be improved.

More preferably, the surface of the clamper 2 facing the first light-emitting element 3 is arranged to be a mirror. The mirror can reflect the light that is emitted by the first light-emitting element 3 to the curved groove 8. As a result, the utilization ratio of the light and the brightness of the light-exiting surface of the light guide plate 6 can both be improved.

Preferably, the clamper 2 is separated into two sections that are butt jointed with each other. The advantage of the design lies in that, when the clamper 2 needs to be assembled with the first light-emitting element 3, the two sections of the clamper 2 can be assembled with the first light-emitting element 3 in sequence so as to facilitate the assembly thereof.

The backplate 5 has a roughly curved plate structure. The light guide plate 6 is installed to the curved backplate 5, and the second surface of the light guide plate 6 is near to the backplate 5. The backplate 5 is used for supporting the light guide plate 6. The clamper 2 and the light bar 4 are both installed to a bottom end of the backplate 5, and the positions thereof are relatively fixed.

Figure 4:
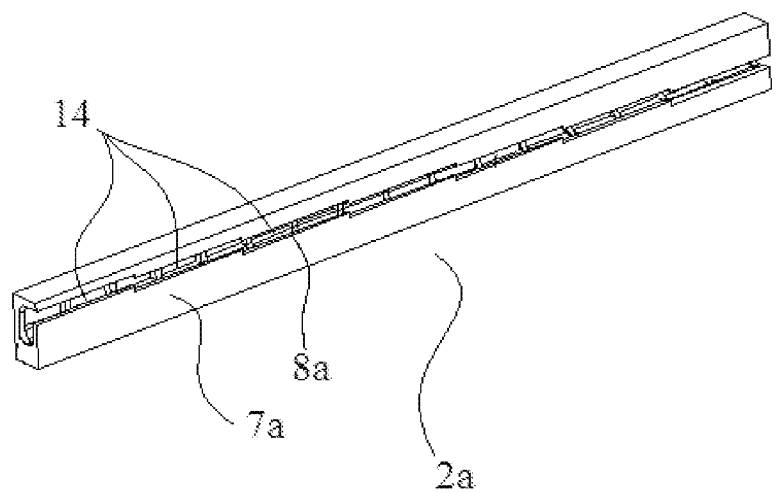
FIG. 4 is a three dimensional diagram of a clamper according to a second embodiment of the present disclosure.

As shown in FIG. 4, according to a second embodiment of the present disclosure, a backlight module is provided.

The difference between the backlight module according to the second embodiment and the backlight module 1 according to the first embodiment only lies in the structure of bulkhead. For brevity, only a bulkhead 7a according to the second embodiment is described below.

According to the second embodiment of the present disclosure, the backlight module comprises a clamper 2a, which comprises a bulkhead 7a. The bulkhead 7a is provided with a plurality of straight grooves 14. The plurality of straight grooves 14 are butt jointed with one another in sequence along a curved line, and thus a curved groove 8a can be fit by the plurality of straight grooves 14. The plurality of straight grooves 14 are parallel with each other, and this kind of straight grooves 14 can be produced easily.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A backlight module, comprising:
a first light-emitting element;
a clamper, which is provided with a curved groove and used for accommodating the first light-emitting element;
wherein the clamper comprises a bulkhead, and the bulkhead is a rectangular plate,
wherein the bulkhead is provided with a curved groove, and the curved groove passes through the bulkhead; and
a light guide plate that is arranged outside the clamper and provided with a curved end surface which faces the first light-emitting element and defines a light-entering surface of the light guide plate,
wherein one plate of the bulkhead abuts on the light-entering surface of the light guide plate, the one plate of the bulkhead having a surface, the curved groove being formed in the one plate of the bulkhead and defining two spaced curved lines on the surface of the one plate of the bulkhead, such that the two curved lines delimit two opposite sides of the curved groove, and wherein the one plate of the bulkhead and the light-entering surface of the light guide plate abut on each other such that the curved end surface of the light guide plate and the curved groove formed in the one plate of the bulkhead are aligned with each other.

2. The backlight module according to claim 1, wherein the first light-emitting element has a straight bar shape, and two ends of the first light-emitting element are aligned with two ends of the curved groove respectively.

3. The backlight module according to claim 2, wherein the clamper is a tube element that is parallel to the first light-emitting element.

4. The backlight module according to claim 3, wherein the first light-emitting element covers the curved groove.

5. The backlight module according to claim 4, wherein the clamper further comprises a fixing element that is used for fixing the first light-emitting element.

6. The backlight module according to claim 5, wherein the clamper comprises a plurality of fixing elements that are arranged spaced from one another in sequence along an extending direction of the first light-emitting element.

7. The backlight module according to claim 6, wherein the fixing elements are configured to be plates that are perpendicular to the first light-emitting element and through which the first light-emitting element passes.

8. The backlight module according to claim 7,
wherein the first light-emitting element is a quantum tube;
wherein the backlight module further comprises a second light-emitting element that is arranged outside the clamper and used for exciting the first light-emitting element; and
wherein the clamper further comprises a light-entering opening that is arranged between the first light-emitting element and the second light-emitting element.

9. The backlight module according to claim 3, wherein the clamper further comprises a fixing element that is used for fixing the first light-emitting element.

10. The backlight module according to claim 9, wherein the clamper comprises a plurality of fixing elements that are arranged spaced from one another in sequence along an extending direction of the first light-emitting element.

11. The backlight module according to claim 10, wherein the fixing elements are configured to be plates that are perpendicular to the first light-emitting element and through which the first light-emitting element passes.

12. The backlight module according to claim 11,
wherein the first light-emitting element is a quantum tube;
wherein the backlight module further comprises a second light-emitting element that is arranged outside the clamper and used for exciting the first light-emitting element; and
wherein the clamper further comprises a light-entering opening that is arranged between the first light-emitting element and the second light-emitting element.

13. The backlight module according to claim 2, wherein the clamper further comprises a fixing element that is used for fixing the first light-emitting element.

14. The backlight module according to claim 13, wherein the clamper comprises a plurality of fixing elements that are arranged spaced from one another in sequence along an extending direction of the first light-emitting element.

15. The backlight module according to claim 14, wherein the fixing elements are configured to be plates that are perpendicular to the first light-emitting element and through which the first light-emitting element passes.

16. The backlight module according to claim 15,
wherein the first light-emitting element is a quantum tube;
wherein the backlight module further comprises a second light-emitting element that is arranged outside the clamper and used for exciting the first light-emitting element; and
wherein the clamper further comprises a light-entering opening that is arranged between the first light-emitting element and the second light-emitting element.

17. The backlight module according to claim 1, wherein the curved groove is fit by a plurality of straight grooves that are connected with one another in sequence along a curved line.

18. The backlight module according to claim 17, wherein the clamper further comprises a fixing element that is used for fixing the first light-emitting element.

19. The backlight module according to claim 18, wherein the clamper comprises a plurality of fixing elements that are arranged spaced from one another in sequence along an extending direction of the first light-emitting element.

20. A liquid crystal display device, comprising a backlight module, which comprises:
- a first light-emitting element;
- a clamper, which is provided with a curved groove and used for accommodating the first light-emitting element; and
- wherein the clamper comprises a bulkhead, and the bulkhead is a rectangular plate,
- wherein the bulkhead is provided with a curved groove, and the curved groove passes through the bulkhead; and
- a light guide plate that is arranged outside the clamper and provided with a curved end surface which faces the first light-emitting element and defines a light-entering surface of the light guide plate,
- wherein one plate of the bulkhead abuts on the light-entering surface of the light guide plate, the one plate of the bulkhead having a surface, the curved groove being formed in the one plate of the bulkhead and defining two spaced curved lines on the surface of the one plate of the bulkhead, such that the two curved lines delimit two opposite sides of the curved groove, and wherein the one plate of the bulkhead and the light-entering surface of the light guide plate abut on each other such that the curved end surface of the light guide plate and the curved groove formed in the one plate of the bulkhead are aligned with each other.

* * * * *